Inventor
Otto Karcher
By Harry Frease
Attorney

Patented Feb. 24, 1931

1,794,178

UNITED STATES PATENT OFFICE

OTTO KARCHER, OF CANTON, OHIO

LAWN TRIMMER

Application filed June 22, 1929. Serial No. 372,950.

The invention relates to lawn trimmers for trimming close to walls, walks, shrubbery, trees and the like; and more particularly to a rotary trimmer.

The object of the improvement is to provide a lawn trimmer including one or more fixed blades carried by an operating handle and a plurality of rotatable blades arranged to cooperate therewith and mounted upon a traction wheel or roller adapted to be run over the ground to give rotary motion to said blades.

Figure 1:
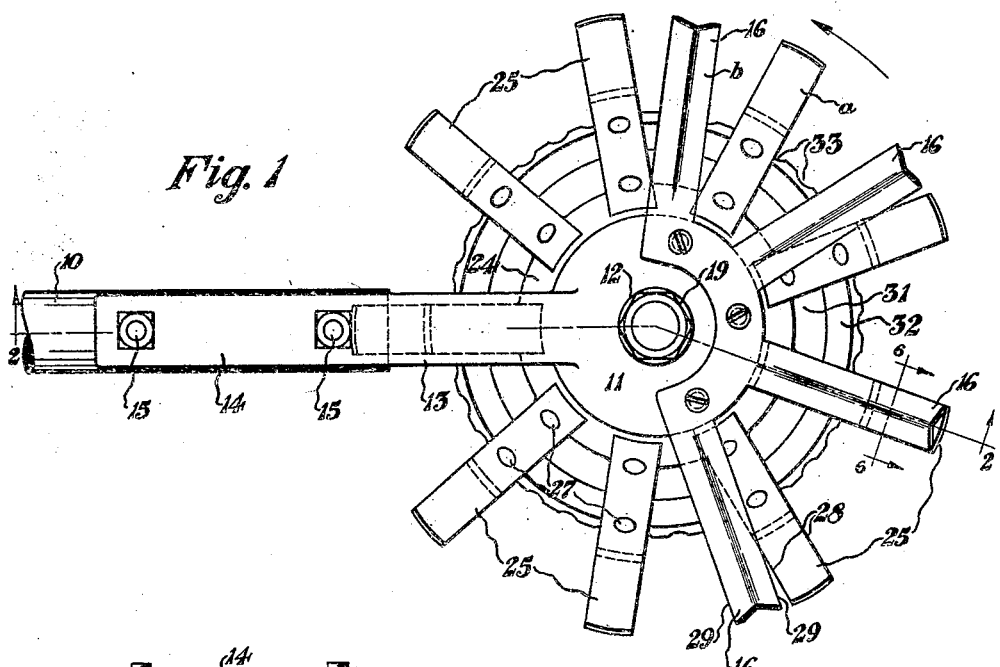
Figure 2:
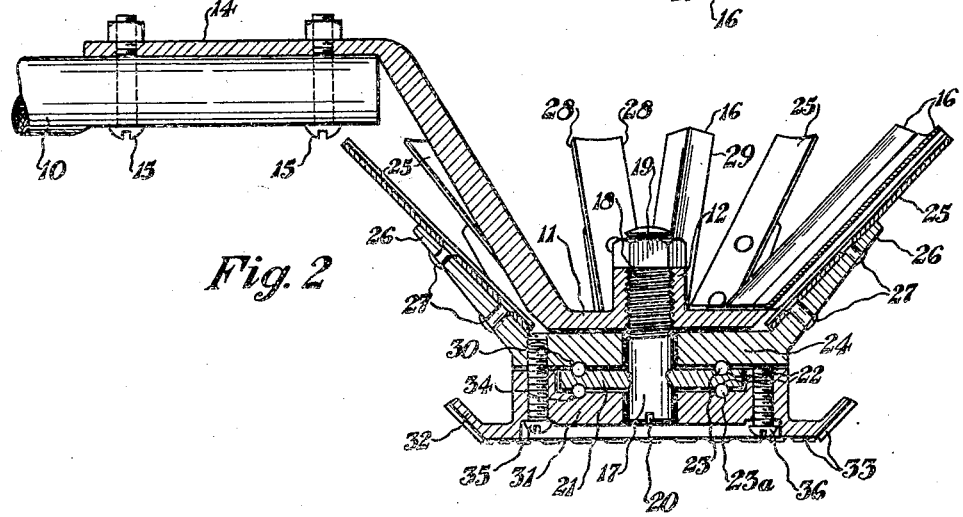
Figure 6:
Figures 3, 4, 5:
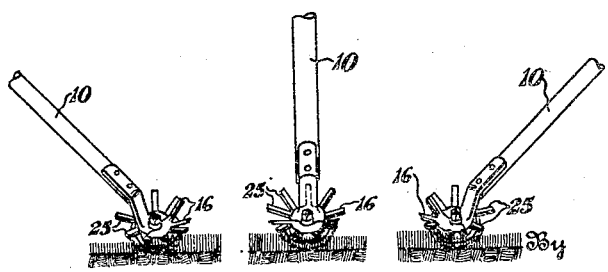

An embodiment of the invention is illustrated in the accompanying drawing, in which Figure 1 is a plan view of the improved lawn trimmer;

Fig. 2, a longitudinal sectional view through the trimmer taken substantially on the lawn 2—2, Fig. 1;

Figs. 3, 4 and 5, perspective views, upon a smaller scale, showing the various positions in which the trimmer may be operated; and Fig. 6, a section through the blades on the line 6—6, Fig. 1.

Similar numerals refer to similar parts throughout the drawing.

The handle 10 may be of wood or the like and of sufficient length to permit the operator to stand in an upright position when manipulating the trimmer upon the ground.

The fixed blade holder may be in the form of a metal disk 11 having a central internally threaded boss 12 and provided at one side with the angular bracket arm 13 terminating in the attaching flange 14, preferably located in a plane parallel to the disk 11, and arranged to be connected to the lower end of the handle by any suitable means such as the bolts 15.

The fixed blades 16, preferably four in number, may be rigidly attached to or formed integrally with the disk 11 and are located radially to the center of said disk and bear outward at a considerable angle to the normal plane thereof, as best shown in Fig 2.

A shaft 17 is provided with the screw threaded end 18 located within the internally threaded boss 12, a jamb nut 19 being mounted thereon for holding the shaft in adjusted position, and a screw driver slot 20 being preferably provided in the opposite end of the shaft for adjusting the shaft in the internally threaded boss 12.

A disk 21 is fixed or formed integrally upon the shaft 17 at a point between the screw threads 18 and the slotted end of the shaft and this disk is provided upon opposite faces with the annular ball races 22 to receive the antifriction balls 23 and 23a.

The rotary frame for carrying the rotatable cutting blades comprises the hub portion 24, journaled upon the shaft 17, and the radial angular cutting blades 25, which may be attached to the blade supporting arms 26 by rivets 27 or the like, as illustrated in the drawings, or which may be formed integrally with the hub 24.

These rotatable blades are preferably concaved and, as shown in the drawings, the stationary blades or guards are also concaved and cutting edges 28 are formed upon each side of the rotary blades to coact with corresponding cutting edges 29 formed upon each side of the stationary blades.

The hub 24 of the rotatable blade frame is provided with an annular ball race 30 to receive the balls 23, providing a ball bearing between the disk 21 and the rotatable blade frame.

The traction wheel or ground wheel which imparts rotation to the rotatable blades comprises the hub portion 31 journaled upon the shaft 17, and the conical rim or tread portion 32 preferably inclined at substantially the same angle as the blades, as best shown in Fig. 2 and preferably corrugated or serrated, as shown at 33, in order to grip the surface of the ground as the wheel is moved over the same.

The hub 31 of the wheel is provided with the annular ball race 34 coacting with the lower ball race 22 to receive the antifriction balls 23a forming a ball bearing between the wheel and the disk or flange 21.

The rotatable blade frame and wheel are arranged to be rigidly connected together in adjusted position as by the attaching screws 35 and the set screws or spacing screws 36 threaded in the wheel and adapted to butt against the face of the blade frame, there being preferably three of each screws located at spaced intervals around the wheel and frame.

Although the fixed blades or guards are shown upon the inside and the rotating blades upon the outside, it should be understood that this order may be reversed without departing from the invention, which resides primarily in the provision of the coacting inclined or angular fixed and rotating blades connected to the handle and ground wheel or roller respectively, and operable in either direction.

In operating the device, the end portion of the handle is gripped by the operator and the ground wheel or roller is rolled upon the ground, the whole device being so tilted that the lowermost blades will be substantially parallel with the ground.

As shown in Figs. 3, 4 and 5, the trimmer may be operated either left-handed or right-handed or to cut straight across in front of the operator and may be operated either forward or backward so as to rapidly cut or trim the grass in a wide sweeping curve if desired.

This construction permits the trimmer to be operated right up against walls, trees, shrubbery and the like and makes the same particularly adaptable for trimming around monuments and tombstones in cemeteries.

In order that there may be a continuous cutting action, the fixed blades 16 are so spaced with reference to the spacing of the rotating blades that only one fixed blade, and a coacting rotating blade, will be cutting at a time.

This arrangement of the blades is illustrated in Fig. 1 where, assuming the rotating blades are traveling in the direction of the arrow, the rotating blade $a$ is in position to start cutting in cooperation with the fixed blade $b$.

I claim:

1. A lawn trimmer including a handle, a blade fixed upon the handle, a ground wheel rotatably connected to the handle and adapted to be rotated by movement of the lawn trimmer on the ground, and a plurality of rotatable blades fixed to the ground wheel and adapted to coact with the fixed blade, all of said blades being located at an angle to the normal plane of the ground wheel.

2. A lawn trimmer including a handle, a plurality of blades fixed upon the handle, a ground wheel rotatably connected to the handle and adapted to be rotated by movement of the lawn trimmer on the ground, and a plurality of rotatable blades fixed to the ground wheel and adapted to coact with the fixed blades, all of said blades being located at an angle to the normal plane of the ground wheel.

3. A lawn trimmer including a handle, a plurality of blades fixed upon the handle, a ground wheel rotatably connected to the handle, and adapted to be rotated by movement of the lawn trimmer on the ground, and a plurality of rotatable blades fixed to the ground wheel and adapted to coact with the fixed blades, all of said blades being located at an angle to the normal plane of the ground wheel, the fixed blades and rotatable blades being so relatively spaced that cutting will take place between only one fixed blade and a coacting rotatable blade at a time.

4. A lawn trimmer including a handle, a bracket fixed upon the handle, a plurality of angular cutting blades fixed upon the bracket, a shaft carried by the bracket, a rotatable frame journaled upon the shaft, a plurality of angular cutting blades carried by the rotatable frame and arranged to coact with the fixed blades, and a ground wheel fixed to the rotatable frame and adapted to be rotated by movement of the lawn trimmer over the ground.

5. A lawn trimmer including a handle, a bracket fixed upon the handle, a plurality of angular cutting blades fixed upon the bracket, a shaft carried by the bracket and located at right angles to the handle, a rotatable frame journaled upon the shaft, a plurality of angular cutting blades carried by the rotatable frame and arranged to coact with the fixed blades, and a ground wheel fixed to the rotatable frame and adapted to be rotated by movement of the lawn trimmer over the ground.

6. A lawn trimmer including a handle, a bracket fixed upon the handle, a plurality of angular cutting blades fixed upon the bracket, a shaft adjustably secured to the bracket, a rotatable frame journaled upon the shaft, a plurality of angular cutting blades carried by the rotatable frame and arranged to coact with the fixed blades, and a ground wheel fixed to the rotatable frame and adapted to be rotated by movement of the lawn trimmer over the ground.

7. A lawn trimmer including a handle, a blade fixed upon the handle, a plurality of rotatable blades mounted upon the handle and adapted to coact with the fixed blade, and means fixed to the rotatable blades for contact with the ground for rotating the rotatable blades as the lawn trimmer is moved over the ground, all of said blades being located at an acute angle to the axis of rotation of the rotatable blades.

8. A lawn trimmer including a handle, a plurality of blades fixed upon the handle, a plurality of rotatable blades mounted upon the handle and adapted to coact with the fixed blades, and means fixed to the rotatable blades for contact with the ground for rotating the rotatable blades as the lawn trimmer is moved over the ground, all of said blades being located at an acute angle to the axis of rotation of the rotatable blades.

9. A lawn trimmer including a handle, a plurality of blades fixed upon the handle, a plurality of rotatable blades mounted upon the handle and adapted to coact with the fixed blades and means fixed to the rotatable blades for contact with the ground for rotating the rotatable blades as the lawn trimmer is moved over the ground, the fixed blades and rotatable blades being so relatively spaced that cutting will take place between only one fixed blade and a coacting rotatable blade at a time.

In testimony that I claim the above, I have hereunto subscribed my name.

OTTO KARCHER.